No. 678,132. Patented July 9, 1901.
F. E. JOHNSON.
HANDLE FOR STOP AND WASTE COCKS.
(Application filed Apr. 9, 1901.)
(No Model.)
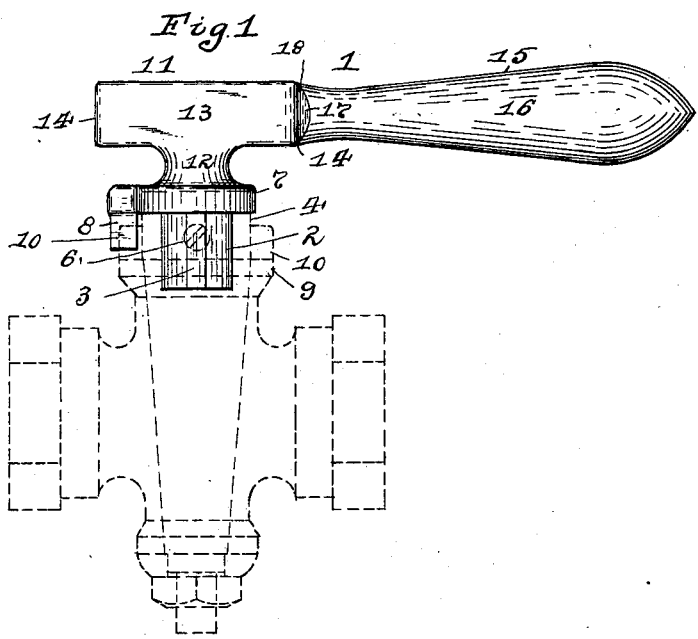
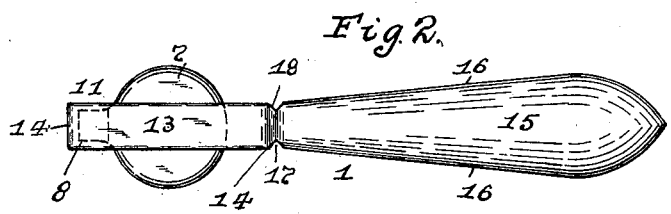
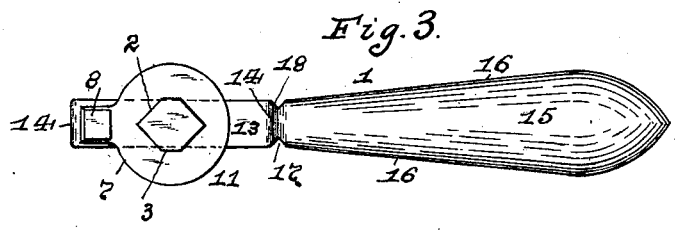
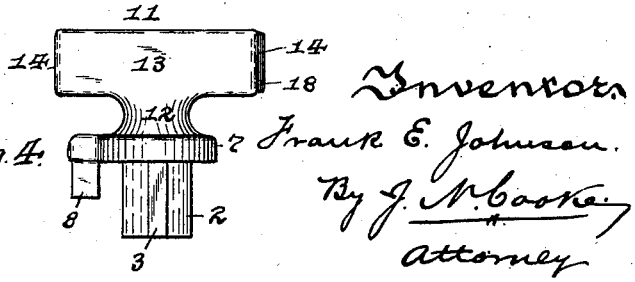
Witnesses:
J. L. Trefaller, Jr.
W. B. Beatty
Inventor
Frank E. Johnson.
By J. N. Cooke
Attorney
THE NORRIS PETERS CO., PHOTO-LITHO., WASHINGTON, D. C.

UNITED STATES PATENT OFFICE.

FRANK E. JOHNSON, OF GREENSBURG, PENNSYLVANIA, ASSIGNOR TO JOHN T. KELLY, OF BROOKLYN, NEW YORK, AND GEORGE M. JONES, OF PITTSBURG, PENNSYLVANIA.

HANDLE FOR STOP AND WASTE COCKS.

SPECIFICATION forming part of Letters Patent No. 678,132, dated July 9, 1901.

Application filed April 9, 1901. Serial No. 54,974. (No model.)

*To all whom it may concern:*

Be it known that I, FRANK E. JOHNSON, a resident of Greensburg, in the county of Westmoreland and State of Pennsylvania, have invented a new and useful Improvement in Handles for Stop and Waste Cocks; and I do hereby declare the following to be a full, clear, and exact description thereof.

My invention relates to handles for cocks, valves, &c., and has special reference to handles for use on stop and waste cocks.

The object of my invention is to cheapen the cost of these handles and to provide one which can be formed in such manner or shape as will enable it to be used in different places and for different purposes when desired.

My invention consists, generally stated, in the novel arrangement, construction, and combination of parts, as hereinafter more specifically set forth and described, and particularly pointed out in the claims.

To enable others skilled in the art to which my invention appertains to construct and use my improved handle, I will describe the same more fully, referring to the accompanying drawings, in which—

Figure 1 is a side view of my improved handle, showing the same applied to a stop and waste cock, the cock being shown in dotted lines. Fig. 2 is a top view of the handle. Fig. 3 is a bottom view of the same, and Fig. 4 is a side view showing the gripping portion removed.

Like symbols of reference herein indicate like parts in each of the figures of the drawings.

As illustrated in the drawings, my improved handle is shown at 1 and is provided with a stem 2 thereon of angular form in cross-section and having two of its corners flattened, as at 3. The stem 2 is adapted to fit within a like-shaped socket formed in the plug 4 of the cock 5 and is held therein by means of a set-screw 6, engaging with one of the flat faces 3. The handle 1 is provided with a circular portion or rim 7 above said stem 2, from which a lug 8 projects down parallel with said stem for engaging with two stop-shoulders 10 on the top 9 of the cock 5. A T-shaped portion 11 is formed above said circular rim 7, which is composed of the shank 12, connected to said rim 7, and the cross-piece 13 above said shank 12. Connected to one of the ends 14 of the cross-piece 13 and formed as part thereof is the gripping lever or portion 15, and formed in the sides 16 thereof, adjacent to said end 14, are the recesses or notches 17, which are preferably formed of triangular or bevel shape, as at 18.

The use and operation of my improved handle are as follows: When it is desired to use the same for house-service, the handle 1 is placed on the cock 5 by inserting its stem 2 in the opening formed in the plug 4, when the set-screw 6 can be screwed to place against the flat surface 3 on said stem in order to hold said handle 1 within said plug 4. When it is desired to close said cock 5, all that is necessary is for the operator to grasp the gripping portion 15 on said handle 1 and give the same a one-quarter turn, which will cause the set-screw 6 to come in contact with one of the shoulders 10 on the top 9 of the valve 5, while the lug 8 on the circular portion or rim 7 of said handle 1 will assume the original position occupied by the set-screw 6 and so turn the plug 4 to close the valve. When it is desired to open said valve 5, all that is required is for the operator to grasp the gripping portion of said handle 1 and turn the same in the opposite direction from that above described, when the lug 8 will strike against the opposite shoulder 10 and the set-screw will assume its original position, as shown in Fig. 1, so turning the plug 4 back to open the valve and bring both the handle 1 and plug 4 to their normal positions.

The form of handle and cock illustrated is designed for use in connection with what are known as "right and left hand stop and waste cocks," and when it is desired to change said handle 1 all that is necessary is to unscrew the set-screw 6 sufficiently to allow the stem 2 of said handle to be removed from the opening in said plug 4, when said handle 1 can be reversed and the stem 2 inserted within the plug 4. After this is done the handle 1 can be secured in said plug 4 by the set-screw 6 bearing against the stem 2 and the operations of opening and closing the cock carried out as before described.

When it is desired to use the handle 1 for street-service, in which case the gripping portion 15 on the handle 1 is not required, all that is necessary for such purpose is for the operator to knock off the portion 15 from the T-shaped portion 11, which can be done by striking the same with a hammer or other instrument at a point on the sides 16 adjacent to said notches 17, when said portion 15 will sever itself from said T-shaped portion 11 at the notches 17 on the end 14 of said portion 11, as shown in Fig. 4, and so permit said T-shaped portion 11 with its component parts for operating the cock to be used on said cock and operated, as above described, by the use of a wrench or other device engaging with the cross-piece 13 of said T-shaped portion.

It will thus be seen that my improved handle is cheap and simple in its construction and will do away with having two forms of handles for use in house and street service cocks and will permit either one or the other to be used as desired. The one part can be easily and quickly separated from the other without injury to the T-shaped handle, and when intact the entire handle is strong and sufficiently thick at the severing-junction as to permit any liability of fracture at such point when the entire handle is in use or in shipping and handling. The handle can be applied to the ordinary stop and waste cocks as well as right and left hand stop and waste cocks and also other cocks and valves desiring such a form of handle.

What I claim as my invention, and desire to secure by Letters Patent, is—

1. A handle for cocks, valves, &c., having a handle portion thereon, another handle portion formed as part of the first handle portion, and notches formed between said handle portions to permit the severing of the same and form a complete first handle portion.

2. A handle for cocks, valves, &c., having a T-shaped portion thereon, a gripping portion formed as part of said T-shaped portion, and notches formed between said T-shaped portion and gripping portion to permit the severing of the same and form a complete T-shaped portion.

3. A handle for cocks, valves, &c., having a T-shaped portion thereon, a gripping portion connected to the end and formed as part of the cross-piece on said T-shaped portion, and notches between the end of said cross-piece and the gripping portion to permit the severing of the gripping portion and form a complete T-shaped handle.

In testimony whereof I, the said FRANK E. JOHNSON, have hereunto set my hand.

FRANK E. JOHNSON.

Witnesses:
GEORGE WOLCOTT,
GEO. S. POINTER.